(No Model.)
E. NELSON.
TIRE FOR BICYCLES.
No. 578,258. Patented Mar. 2, 1897.
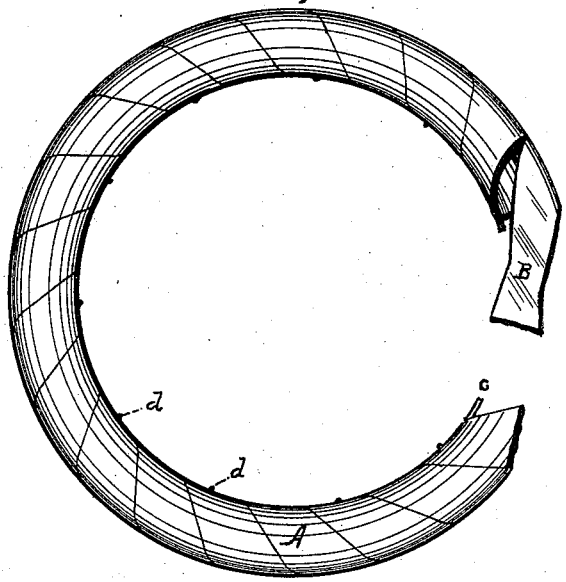
Fig. 1.
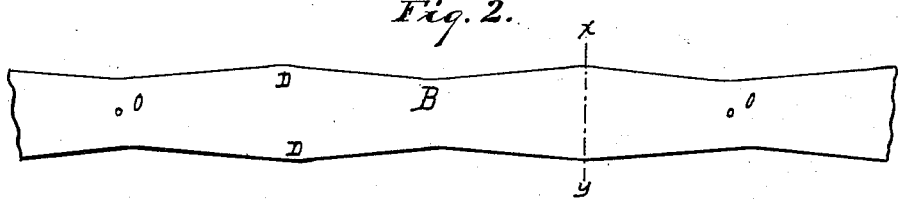
Fig. 2.
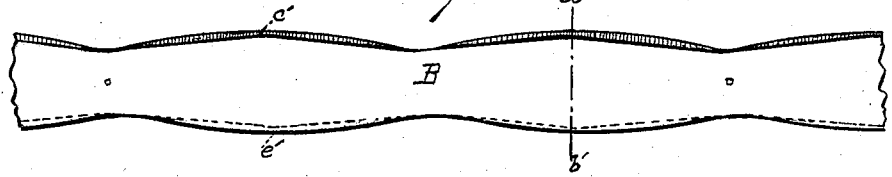
Fig. 3.
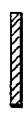 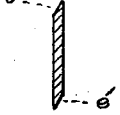
Fig. 4.  Fig. 5.
WITNESSES
E. D. Cook
J. F. Estes
INVENTOR
Edward Nelson
BY
Horatio E. Bellows
ATTORNEY
THE NORRIS PETERS CO., PHOTO-LITHO., WASHINGTON, D. C.

UNITED STATES PATENT OFFICE.

EDWARD NELSON, OF PROVIDENCE, RHODE ISLAND.

TIRE FOR BICYCLES.

SPECIFICATION forming part of Letters Patent No. 578,258, dated March 2, 1897.

Application filed January 4, 1897. Serial No. 617,888. (No model.)

*To all whom it may concern:*

Be it known that I, EDWARD NELSON, a citizen of the United States, residing at Providence, in the county of Providence and State of Rhode Island, have invented a new and useful Tire for Bicycles and Vehicles, of which the following is a specification.

In pneumatic tires hitherto constructed the desiderata have been lightness and imperviousness and resiliency. These ends have sometimes been sought by winding metal spirally and incasing the shell so formed in an elastic covering to neutralize the inequalities upon the inclosed metal surface which result from the shape of the metal wound. Previous attempts to form a shell by winding flat strips have necessitated the lapping of each successive coil over its predecessor, thus unnecessarily increasing the weight and irregularity of the shell. My tire presents a surface so smooth that an outer casing is unnecessary, and the usual advantages sought by the use of pneumatic tires are better secured in a simple and inexpensive manner.

I attain my object by means of the construction shown in the accompanying drawings, in which—

Figure 1 is a perspective view of my tire. Fig. 2 is a plane view of the strip to be wound, having angular swells D. Fig. 3 is a strip similar to Fig. 2, except that its angular swells are so beveled that their peripheries are circular in outline and so thin as to give the appearance of a fish-scale. Fig. 4 is a sectional view of strip shown in Fig. 2 upon line $x\ y$. Fig. 5 is a section on line $a'\ b'$ of Fig. 3.

Similar letters refer to similar parts throughout the several views.

In Fig. 1, A is the shell or tire, formed by winding the metal strip B into successive coils, each of whose edges abuts against its predecessor at every point and produces a smooth surface. These coils are held in position by one or more metal strips $c$, extending along the inner surface of the tire at right angles to the coils and fastened at intervals thereto by rivets $d$, or by any other convenient means.

In Fig. 2, B is a thin metal strip of uniform thickness throughout, with rivet-holes $o$ at intervals. Its lateral edges on both sides have the form of a series of obtuse angles D, with slightly-rounded apexes. These angular swells are equal in length and increase and diminish in diameter regularly, each edge being at every point equidistant with its opposite from the axial line of the strip B.

In winding, the parts of the strip with the narrower diameters abut upon each other, and those parts with longer diameters are contiguous throughout. Thus the successive spirals form a shell or tire whose outer periphery exceeds its inner and whose longitudinal increase is circular. By varying the length and depth of the angular swells the diameter of the completed tire is correspondingly increased or diminished.

Fig. 3 presents a modification of the strip shown in Fig. 2 and above described. By thus beveling the angular swells, as at $c'$ and $e'$ in Figs. 3 and 5, no openings between the coils can possibly appear upon the tire-surface, notwithstanding any weight to which the tire may be subjected.

I am aware that prior to my invention tires have been constructed containing wound metal. This I do not claim; but What I do claim as my invention, and desire to secure by Letters Patent, is—

1. In a tire for bicycles and other vehicles the combination of a specially-wound strip of metal B, having a series of beveled angular swells, of equal dimensions, throughout its length, and one or more strips of metal extending longitudinally along the inner surface of the shell thus formed, and attached thereto at intervals, substantially as and for the purposes set forth.

2. A tire for bicycles and vehicles consisting of a spirally-wound strip of metal B, having a series of beveled angular swells, of equal dimensions throughout its length, as and for the purposes set forth.

3. In a tire for bicycles and vehicles the combination of a spirally-wound strip of metal B, having a series of angular swells, of equal dimensions, throughout its length, and one or more strips of metal extending longitudinally along the inner surface of the shell thus formed, and attached thereto at intervals, substantially as and for the purposes set forth.

4. A tire for bicycles and vehicles consisting of a spirally-wound strip of metal B, having a series of angular swells, of equal dimensions, throughout its length, as and for the purposes set forth.

EDWARD NELSON.

Witnesses:
C. D. COOK,
J. F. ESTES.